Sept. 12, 1961 D. S. HORNE ET AL 2,999,347
SELF-PROPELLED COMBINE
Filed June 24, 1958 6 Sheets-Sheet 1

Fig.1

INVENTORS.
DONALD S. HORNE,
ROBERT ASHTON, &
LESLIE L. KEPKAY
BY
Carlson, Pitzner, Hubbard & Wolfe
ATTORNEYS.

Sept. 12, 1961　　　D. S. HORNE ET AL　　　2,999,347
SELF-PROPELLED COMBINE

Filed June 24, 1958　　　　　　　　　　　　　6 Sheets-Sheet 3

Fig. 3

INVENTORS.
DONALD S. HORNE,
ROBERT ASHTON, &
BY　LESLIE L. KEPKAY

ATTORNEYS.

Fig. 6

Sept. 12, 1961 D. S. HORNE ET AL 2,999,347
SELF-PROPELLED COMBINE
Filed June 24, 1958 6 Sheets-Sheet 6

INVENTORS.
DONALD S. HORNE,
ROBERT ASHTON, &
LESLIE L. KEPKAY
BY Carlson, Pitzner, Hubbard & Wolfe
ATTORNEYS.

United States Patent Office 2,999,347
Patented Sept. 12, 1961

2,999,347
SELF-PROPELLED COMBINE
Donald S. Horne, Robert Ashton, and Leslie L. Kepkay, all of Toronto, Ontario, Canada, assignors to Massey-Ferguson Limited, Toronto, Ontario, Canada, a corporation of Canada
Filed June 24, 1958, Ser. No. 744,156
17 Claims. (Cl. 56—21)

The present invention relates to agricultural harvesting machines of the self-propelled combine type, and concerns more particularly the construction and arrangement of the several components and sub-assemblies making up a machine of this type.

It is a primary aim of the invention to provide a novel, self-propelled combine, of high capacity and performance, having an exceptionally low silhouette so as to be more attractive and better able to operate and be transported in areas of limited overhead clearance. It is a collateral object of the invention to provide a combine having a low center of gravity in all conditions of operation so as to be more stable and easier to operate over sloping terrain.

It is also a primary object of the invention to provide a novel combine as referred to above which is not only low but also sufficiently narrow to permit transport on the highways without special permit and without sacrificing capacity or performance.

It is a further object of the invention to provide a combine as described above that is attractive in the sense of presenting a symmetrical balanced appearance together with the low silhouette previously mentioned, and which has its driving belts and chains fitted into the structural arrangement so as to be shielded and unobtrusive.

It is another object to provide a combine of the above type which is unusually easy to service and maintain in that the power plant and the various power trains lie, in the most part, at the top and sides of the combine frame so as to be readily accessible, rather than being buried in the interior of the combine frame.

Moreover, it is an object to provide a combine having the above characteristics whose major components, including the engine and the grain storage tank, are arranged along the combine center line so that the combine is properly balanced with an approximately equal loading on opposite wheels at all times.

It is yet another object to provide a combine as characterized above whose arrangement simplifies both the provision of power drives to the various operating mechanisms and the construction of controls for those drives.

It is a more detailed object to provide a combine as described above which is exceptionally strong and rigid because of its compact arrangement and due to a novel grain tank and body structure.

It is a still further object to provide a combine having the above features whose design facilitates simple modification of the basic machine by readily permitting both the header assembly and the separator assembly to be replaced by units either of different capacity or adapted to handle different crops.

It is an additional object to provide a combine of the above character which affords excellent operator visibility since the operator's platform is above and forward of the threshing cylinder and yet close to ground level.

Also it is an object to provide a combine of the above referred to type in which the fire hazard is minimized by elevating and shielding the internal combustion power plant from the regions of the combine which are clouded by combustible chaff when the machine is in operation.

Other objects and advantages of the invention will become apparent upon reading the following detailed description and upon reference to the drawings in which.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

General arrangement of the combine

Figure 1:
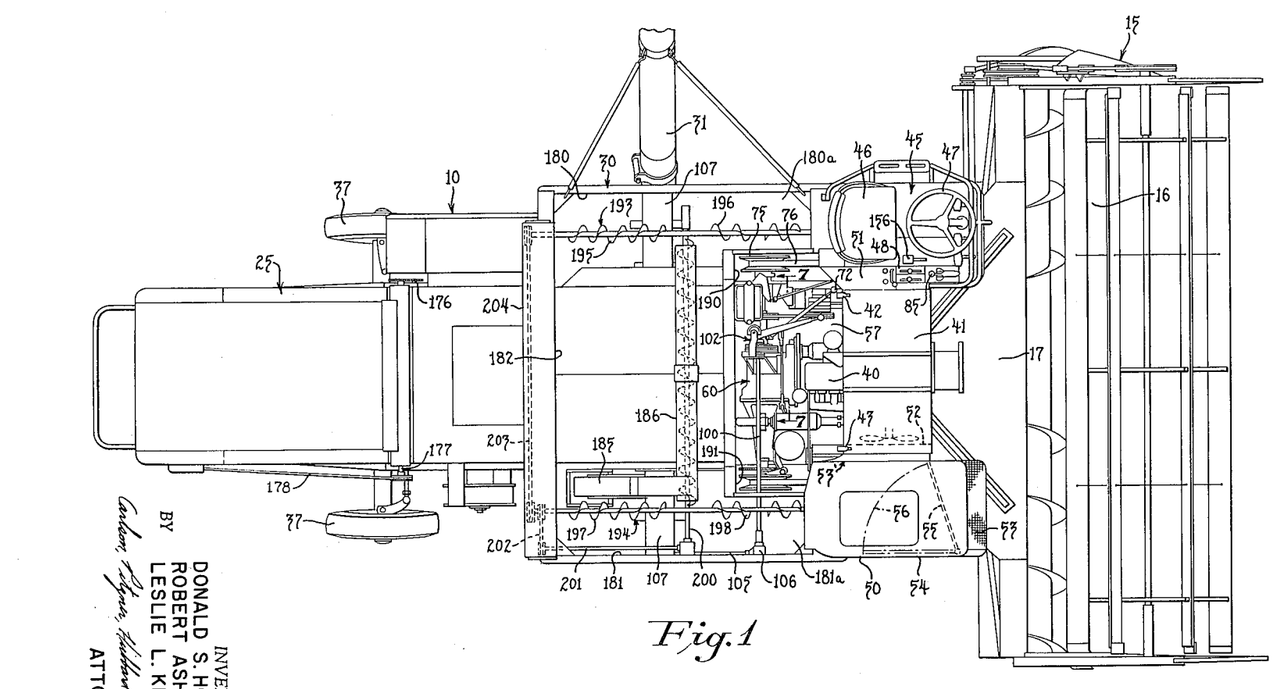
FIGURE 1 is a plan view of a self-propelled combine, in which the unloading mechanism is only fragmentarily shown, constructed in accordance with the present invention.

Turning now to the drawings, there is shown a self-propelled combine 10 embodying the present invention. In general, the combine 10 includes a plurality of units such as a header assembly 15, including a harvesting table 16 and a crop elevator 17, for harvesting the crop, a threshing cylinder 20 carried on a shaft 21 (see FIG. 6) for threshing the crop, and a separator assembly 25 which includes shaker shoes, straw walkers and a fanning mill for separating the desired products from the harvested crop. The combine also includes a grain tank 30 and an unloading auger 31 for temporarily storing the harvested product and for discharging the stored material when desired.

Each of the above units or sub-assemblies and components are mounted on a chassis or frame 35 that is supported by front driving wheels 36 and rear steering wheels 37. The combine is powered by an internal combustion engine 40.

Engine placement

In carrying out the present invention, the engine 40 is mounted above the threshing cylinder 20 at the top of the forward end of the combine frame 35. This arrangement permits the threshing cylinder to be journaled well down in the combine frame so that the entire separator assembly 25 is carried low on the combine and the crop elevator 17 is relatively short. Because the elevator 17 is shorter, the entire header assembly 15 is more rigid, and less power is required to carry the harvested crop from the table 16 to the threshing cylinder.

Also because of the placement of the engine 40 above the threshing cylinder 20, the engine is lifted above those regions of the combine which are clouded with flying foreign material when the combine is in operation. Thus, the fire hazard which is inherent when an internal combustion engine is surrounded with flying, inflammable material is appreciably lessened.

Furthermore, placement of the engine 40 at the top of the combine frame makes the engine readily accessible for servicing and adjustment. In the illustrated embodiment the engine and its accessories are shielded by a curving front panel 41 that is secured in place by releasable latches 42, 43. It can be readily seen that by unlatching and moving the panel 41, the engine 40 is completely exposed and accessible.

As a feature of the invention, the combine 10 is provided with an operator's platform 45 that is positioned on the combine frame above and forward of the threshing cylinder 20 and adjacent the engine 40. In the preferred embodiment, the platform 45 includes a seat 46 supported behind a steering wheel 47 and next to a control panel 48. Since the operator's platform 45 is positioned over, and forward of, the threshing cylinder 20, and since the threshing cylinder is mounted relatively low in the combine frame, it will be appreciated that an operator on the platform is provided with an unusually clear and unobstructed view over the header assembly 15 from a point not too far removed from ground level. Furthermore, the placement of the operator's platform 45 and the engine 40 adjacent one another at substantially a common level in the top or upper portion of the combine frame greatly simplifies the control linkages and connections required to couple the control panel 48 to the engine 40. It will also be obvious that the engine is readily accessible to an operator on the platform 45.

It is an important feature of the invention that the engine 40 is disposed fore-and-aft approximately at the longitudinal mid-point, that is along the center line, of the combine frame, and is sandwiched between the operator's platform 45 and an air intake housing 50 which supplies screened air to the engine. In the preferred embodiment, the operator's platform 45 and the engine 40 are separated by a wall in the form of a column 51 on which the control panel 48 is mounted. The air intake housing 50 is a generally boxlike structure having roughly the same configuration as the operator's platform 45 so as to give the combine design symmetry. The housing 50 is separated from the engine 40 by an upstanding wall 53' including a radiator 52 for the engine.

With particular reference to the construction and operation of the air intake housing 50, it may be noted that this unit is similar in design and function to the construction shown in the copending application Serial No. 620,872, filed November 7, 1956, which is assigned to the assignee of the present application. Since reference may be had to this application for a complete discussion, it is believed sufficient for present purposes to observe that the boxlike air intake housing 50 is provided with front and side screened filtering air intakes 53, 54, respectively, and a valve plate 55 which is pivoted within the housing and oscillated through an arc 56 so as to alternately close off first the front screen 53 and then the side screen 54. In this way, the engine will draw air alternately through the screens 53, 54, and the alternate interruption of airflow through the screens will permit straw and other foreign material drawn against the screens to fall free. This assures the engine 40 of a relatively clean, screened, air supply and avoids having the screens become clogged and ineffective.

Because of the fore-and-aft mounting of the engine 40, the adjoining elements of the combine, i.e. the operator's platform 45 and the air intake housing 50, are positioned relatively close to the combine center line so that they do not project laterally and widen the combine. It can also be seen that the weight of the engine 40 is laterally balanced and does not cause the wheels on one side of the combine to bear more weight than those of the other.

Since the engine 40 is sandwiched between the column 51 of the operator's platform and the air intake housing 50, it will be appreciated that the engine is well shielded both for the sake of combine appearance and to protect the engine. In the preferred combine, a floor panel 57 is mounted on the frame beneath the engine 40 so that the panel 57, the operator's platform 45, the air intake housing 50, and the grain tank 30, combine to form a compartment within which the engine is shielded and protected.

Combine driving mechanisms

In carrying out the invention, a main drive mechanism or unit 60 is mounted at one end of the engine 40 and is extended laterally to each side of the combine frame so as to define a T-shaped structure. The drive unit includes two oppositely directed shafts, one coupled directly to the engine and providing a constant power source and the other being selectively coupled to the engine, as by a clutch in the drive unit 60, so as to provide an easily controlled source of power for the harvesting, threshing and separating components of the combine.

In the illustrated embodiment the drive unit 60 includes a housing 61 (see FIG. 4) secured to the rear end of the engine 40. Journaled transversely in the housing 61 is a stubshaft 62 which is rotatively coupled to the engine flywheel 63 through a pair of speed-reducing bevel gears 64, 65. The shaft 62 projects from the left of the housing 61 and, through an extension shaft 62a, extends beyond the left side panel 66 of the thresher body. The shaft 62 and its extension 62a are connected by a flexible coupling 67.

The righthand end of the shaft 62 projects from the housing 61 into a clutch housing 68 and is coupled to a laterally extending shaft 69 through a clutch 70. As illustrated, the clutch 70 is a conventional, manually operated, dry-disc type clutch, and the clutch housing 68 extends to the right side panel 71 of the combine. The clutch-controlled shaft 69 projects through the panel 71 and thus extends beyond the right side of the combine frame.

The clutch 70 is operated by a hand lever 72, pivoted on the left side of the drive unit 60, that is connected by a link 73 to a clutch shifter lever 74. The lever 74 is coupled to the clutch 70 in the conventional manner.

In order to power the drive wheels 36, the shaft extension 62a carries a pulley 75 positioned beyond the lefthand side of the combine which is coupled by a belt 76 to a second pulley 77 carried on the outer end of a shaft 78 journaled in the bottom of the combine frame. The shaft 78 is selectively coupled through a conventional drive clutch 79 to a four-speed gear box 80 that provides selectable gear ratios between the shaft 78 and an axle 81 on which the wheels 36 are mounted. In the preferred embodiment, the pulley 75 is a conventional variable diameter pulley and a hydraulic motor 82 (see FIG. 4) mounted coaxially of the shaft extension 62a, is provided to vary the diameter of the pulley 75 and thus vary the speed at which the shaft 78 is driven. The clutch 79 is operated by a pedal 83, pivoted on the floor of the operator's platform 45, which is connected to the clutch through a linkage 84 indicated schematically in FIG. 6.

The gear box 80 is preferably provided with three forward speeds and one reverse speed, and the setting of the gears is controlled by a hand lever 85 joined by a link 86 to a conventional gear shifter linkage 87. The hand lever 85 is carried on the top of the operator's control column 51 and is part of the control panel 48.

In order to provide a readily available supply of hydraulic fluid pressure, a hydraulic pump 90 (see FIG. 5) is mounted on the combine frame and is coupled by pulleys 91, 92 and belt 93 to the constantly driven shaft extension 62a. In this way, a supply of hydraulic fluid pressure is available for control purposes whenever the engine 40 is running.

In order to drive the unloading auger 31 independently of the operation of the harvesting, threshing and separating components, the shaft 62 is rotatively coupled through a belt 101 and a clutch 102 to an auger cross shaft 100 which is journaled in a bracket 100a (see FIGS. 7, 8 and 9) parallel to the drive shaft 62. The belt 101 is trained about a pulley 103 on the shaft 62 and a pulley 104 on the shaft 100.

Figure 6:
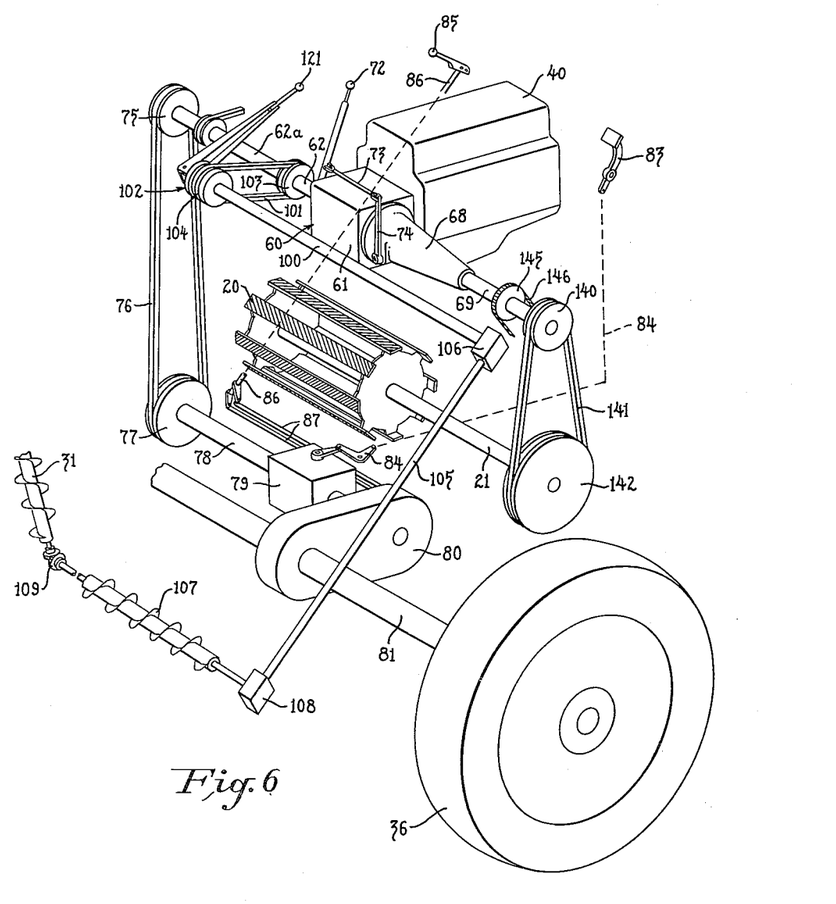

In order to connect the auger cross shaft 100 with the discharge auger 31, the shaft 100 extends beyond the right side of the combine and is connected to a power transmitting shaft 105 through bevel gears contained in a box 106 (see FIGS. 1 and 6). The shaft 105 is rotatively connected to an unloading cross auger 107 through a second set of bevel gears in a box 108, and the cross auger drivingly engages the upwardly inclined unloading auger 31 through gears 109.

The arrangement and function of the cross auger 107 is fully described in copending application Serial No. 738,718, filed May 29, 1958, assigned to the assignee of this application, and to which reference may be had. It will be sufficient for present purposes to observe that the cross auger 107 extends completely across the bottom of the grain tank 30, passing through the combine frame, so to deilver grain carried in the tank to the discharge auger 31.

Figures 7, 8, 9, 10:
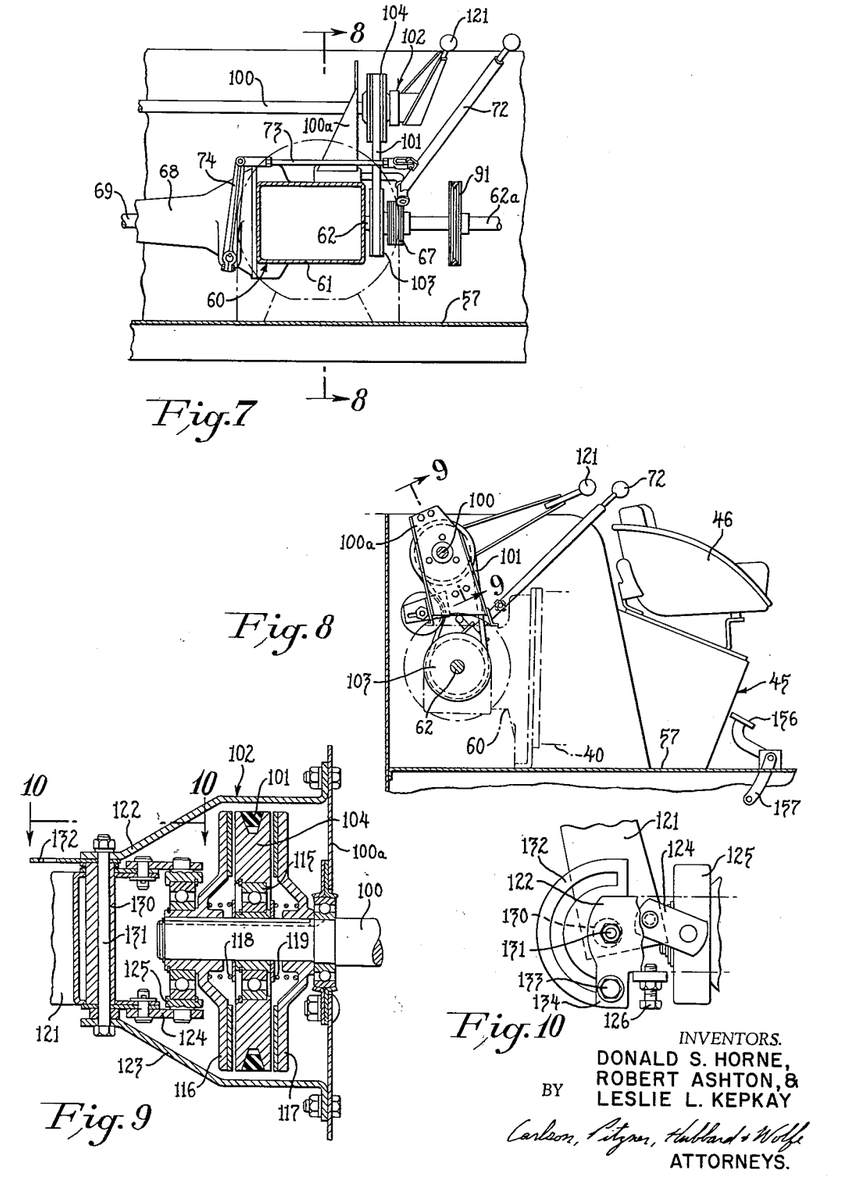
FIG. 7 is a slightly enlarged fragmentary sectional view taken along line 7—7 of FIG. 1.
FIG. 8 is a fragmentary sectional view taken along line 8—8 of FIG. 7.
FIG. 9 is a fragmentary sectional view taken along line 9—9 of FIG. 8.
FIG. 10 is a fragmentary sectional view taken along line 10—10 of FIG. 9.

Turning in more detail to the unloading auger clutch 102 and with particular reference to FIGS. 9 and 10, it will be noted that the driven pulley 104 is rotatively mounted by a bearing 115 on the auger cross shaft 100. Located on either side of the pulley 104 and splined to the shaft 100 are clutch plates 116 and 117. Compressed helical springs 118 and 119 normally hold the pulley 104 and the clutch plates 116, 117 in spaced relation.

For engaging the clutch 102, a hand lever 121 is pivoted on a pair of arms 122, 123 secured to the bracket 100a. The arm 121 is coupled through a link 124 to a clutch throw-in collar 125 mounted on the clutch plate 116. It can be seen that the bottom portion of the lever 121, together with the link 124, forms a toggle linkage between the ends of the bracket arms 122, 123 and the collar 125. When the lever 121 is swung in a clockwise direction as seen in FIG. 10, this toggle linkage is straightened out so as to urge the collar 125 toward the right and thus squeeze the pulley 104 between the clutch plates 116, 117. Continued movement of the lever 121 in a clockwise direction swings the lever against a positionable abutment screw 126, at which point the toggle linkage of the lever 121 and the link 124 is overcentered so that the force of the springs 118, 119 holds the lever 121 against the screw 126 and thus maintains the clutch 102 in its engaged condition whereby power is transmitted from the driven shaft 62 to the auger cross shaft 100. It will be understood that movement of the lever 121 in a counter-clockwise direction will pull the collar 125 to the left in FIG. 10 and will allow the springs 118, 119 to maintain the clutch 102 disengaged.

In order to adjust the pivot point of the lever 121 and thus the operation of the toggle linkage formed by this lever and the link 124, the lever is pivoted about an eccentric sleeve 130 which is rotatively mounted on a bolt 131. Secured to the sleeve 130 is an arcuate clamping member 132 which is clamped by a bolt 133 to a lug 134 formed integrally with the bracket arm 122. It will be appreciated that by loosening the bolt 134 and swinging the clamping member 132 about the bolt 131, the eccentric sleeve 130 will be rotated so as to shift the axis about which the hand lever 121 rotates. In this way, the pivot point of the hand lever can be easily adjusted for proper operation of the clutch 102.

In order to drive the threshing cylinder 20, the shaft 69, which is selectively coupled to the engine 40 by the clutch 70, carries a pulley 140 in its outer end that is connected by a belt 141 to a pulley 142 secured to thresher cylinder shaft 21. In this way, operation of the clutch 70 controls the threshing component of the combine.

Figures 4, 5:
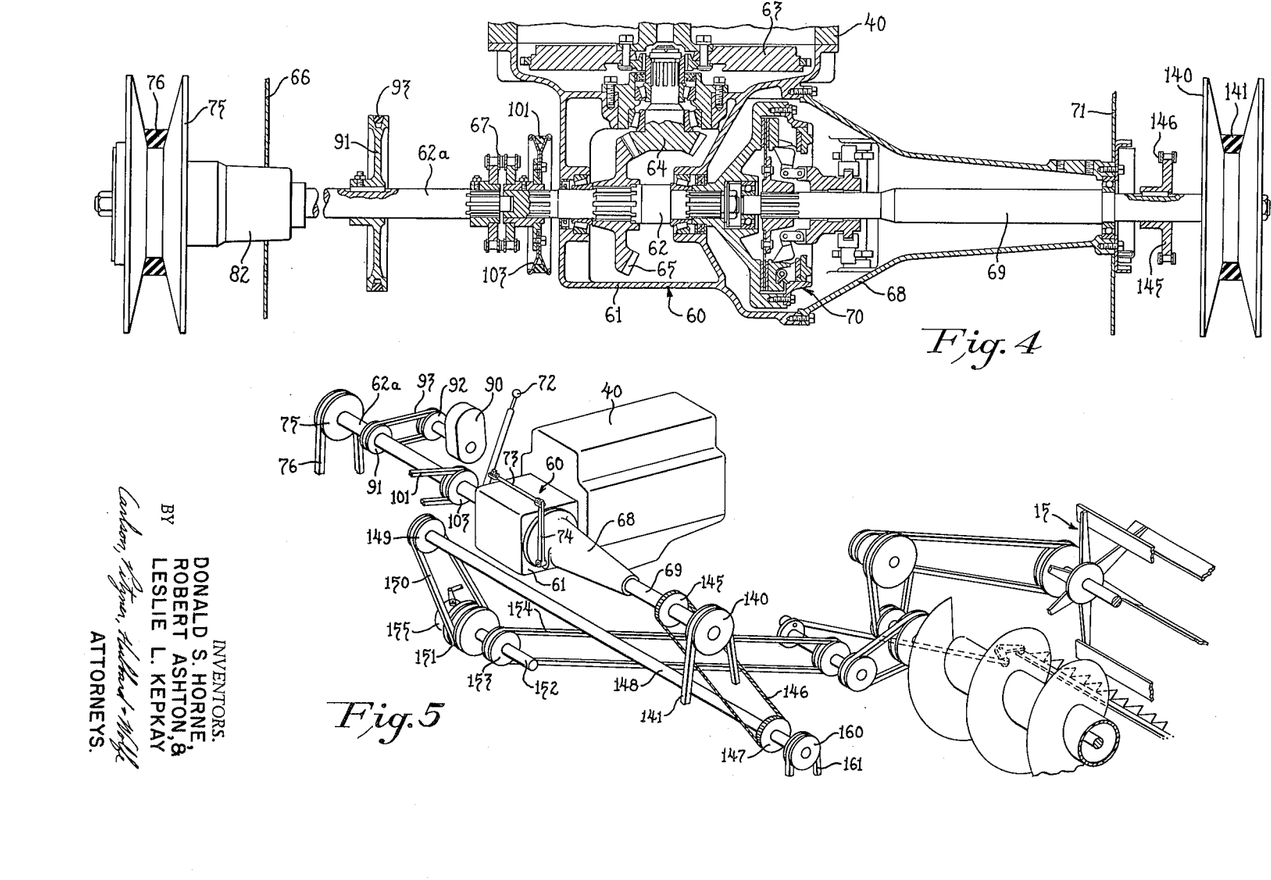
FIG. 4 is an enlarged fragmentary section of the main drive assembly of the combine shown in FIG. 1.
FIGS. 5 and 6 are fragmentary perspective views of portions of the driving train embodied in the combine appearing in FIG. 1, the parts being slightly distorted and enlarged for greater clarity.

For the purpose of powering the header assembly 15, a sprocket 145 is secured to the shaft 69 adjacent the pulley 140 and is connected by a chain 146 to a second sprocket 147 which is secured to a table-drive cross shaft 148 (see FIG. 5). The cross shaft 148 carries a pulley 149 that is coupled by a belt 150 to a pulley 151 on a shaft 152 journaled on the axis about which the header assembly 15 is pivoted to the main combine frame. A pulley 153, carrying a belt 154, rotatively connects the operative elements of the header assembly 15 with the shaft 152, as may be seen in FIG. 5.

Preferably, the pulley 151 is rotatively carried on the shaft 152 and a clutch 155 is provided to selectively couple the pulley 151 with the shaft 152. The clutch 155 is normally engaged and may be disengaged upon operation of a clutch pedal 156 (see FIGS. 1 and 8) to which the clutch is coupled by a linkage 157. The provision of the clutch 155 permits the operator of the combine 10 to instantly disengage the drive to the header assembly 15 should the need suddenly arise.

Figure 2:
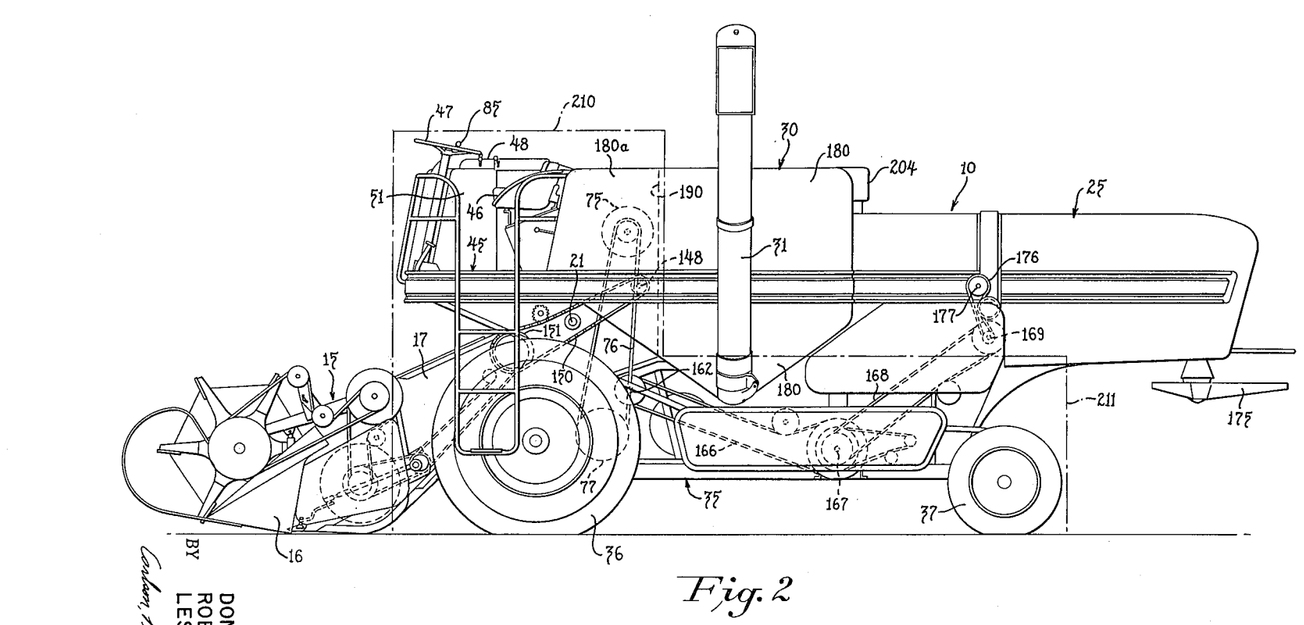
FIG. 2 is an elevation of the left side of the combine shown in FIG. 1.
Figure 3:
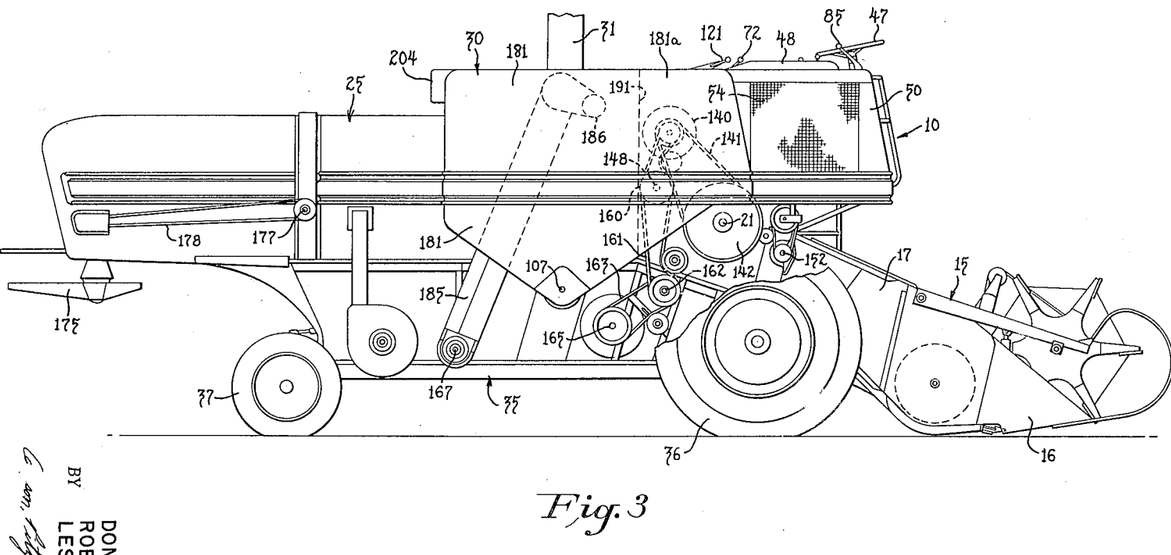
FIG. 3 is an elevation of the right side of the combine shown in FIG. 1 with the unloading mechanism being only fragmentarily shown.

For the purpose of driving the separator components of the combine 10, a pulley 160 is secured to the right-hand end of the table drive cross shaft 148 (see FIG. 5) and is coupled by a belt 161 to a separator drive cross shaft 162 (see FIGS. 2 and 3). At the righthand side of the combine, a belt 163 couples the separator drive cross shaft 162 to the fanning mill shaft 165. At the lefthand side of the combine, a belt 166 couples the separator drive shaft 162 to a shaker shoe drive shaft 167, and from the shaft 167 another belt 168 powers a straw walker drive shaft 169.

In the illustrated embodiment, the combine 10 includes a straw spreader 175 journaled at the rear of the combine which is driven from the straw walker drive shaft 169 by a belt 176, a cross shaft 177 and a belt 178.

It will now be appreciated that the power transmitting means coupling the combine engine 40 to the various driven components of the combine extend, for the most part, across the top of the combine frame and down the opposite sides of the combine. Thus, these various power transmitting means are readily accessible for adjustment and servicing.

It will also be noted that the operator's platform 45 is located immediately adjacent the mechanisms controlling the combine drive, and therefore the control linkages to these mechanisms are short, direct and uncomplicated. For example, the operator's platform is immediately adjacent the engine 40, the unloading auger clutch 102, and the main harvesting, threshing and separating control clutch 70. The operating linkages for controlling these mechanisms are thus quite short and simple. In addition, the operator's platform is directly above the main drive clutch 79, the gear box 80 and the table drive clutch 155. The control linkages for these mechanisms are therefore also short and direct.

*The grain tank*

Pursuant to the invention, the grain tank 30 has a pair of opposite side portions 180 and 181 mounted snugly against the opposite sides of the combine frame behind the operator's platform 45 and the air intake housing 50, respectively, and a center portion 182 communicating with the side portions lying just above the separator assembly 25 behind the engine 40. To deposit grain in the grain tank 30, a grain elevator 185 that is driven from the shaft 167 carries the grain upwardly from the bottom of the separator assembly and feeds it to a distributing auger 186 (see FIG. 1). The elevator 185 is drivingly coupled to the auger 186 so as to power the latter. The construction of the grain loading arrangement, including the details of the distributing auger 186, are fully disclosed in the above-referred-to copending application, Serial No. 738,718. It will be sufficient for present purposes to observe that through the operation of the distributing auger 186, grain from the elevator 185 is deposited in both of the side tank portions 180, 181.

It is important to note that the grain tank 30, with its saddle-like configuration of deep side portions 180, 181 connected by a center portion 182, materially contributes to the low silhouette and narrow lines of the combine 10.

The side tank portions 180, 181 are fitted immediately behind the operator's platform and air intake housing, respectively, so as not to project laterally and increase the width of the combine. The center tank portion 182 is relatively shallow and therefore does not increase the height of the combine.

Furthermore, since the tank structure 30 is symmetrical about the longitudinal center line of the combine, it will be appreciated that the combine can be laterally balanced independently of the grain tank weight and therefore the combine will remain in desired balance whether the grain tank is full or empty. It will also be understood that the saddle-like grain tank 30 can be shifted fore-and-aft of the combine with minimum interference to the other combine elements when the combine is being designed for a specific purpose and capacity.

As a further feature of the present invention, the bottom of the central tank portion 182 is also the top of the separator assembly housing, and the inner sides of the side tank portions 180, 181 are also the side walls of the separator housing. By using common walls for the grain tank 30 and the housing enclosing the separator assembly 25, an unusually strong and economical construction is achieved. The boxlike formation of the grain tank 30 imparts added rigidity to the separator assembly housing.

Moreover, each of the side tank portions 180, 181 are formed with extensions 180a, 181a which are spaced from the separator housing 25 so as to define a pair of shielded pockets 190, 191, respectively, extending down the sides of the combine frame (see FIG. 1). The power transmitting driving means coupling the engine 40 with the driven components of the combine are disposed through these pockets as may be seen in FIGS. 1, 2 and 3. In this way, the various pulleys, chains and sprockets are shielded and protected both for reasons of safety and the over-all appearance of the combine.

As still another feature of the invention, leveling augers 193, 194 are disposed longitudinally in the top of each of the side tank portions 180, 181, respectively.

Each of the leveling augers 193, 194 have oppositely directed flights 195, 196, and 197, 198, respectively, which are effective to move grain forwardly and rearwardly away from the opposite ends of the distributing auger 186. Of course, it will be understood that the leveling augers come into effective operation only after the grain in the side tank portions 180, 181 reaches the height of the distributing auger 186.

The leveling augers are driven from an extension shaft 200 secured to the distributing auger 186 and which is rotatably coupled to a longitudinal shaft 201 (see FIG. 1). The shaft 201 is connected by a belt 202 to the auger 194, and a belt 203 extending along a housing 204 couples the augers 193, 194 for simultaneous rotation.

Because of the fore-and-aft grain spreading effect of the leveling augers, the side tank portions 180, 181 may be made long and narrow to provide the desired grain capacity without increasing the width of the combine, and the grain elevator 185 need not be extended beyond the top of the grain tank 30 which would increase the over-all height of the combine.

*Combine frame configuration*

Another important feature of the invention can now be appreciated by noting that the combine 10 includes a main chassis made up of a generally L-shaped frame structure having a short upstanding leg portion, outlined by the block 210 in FIG. 2, at the front end of the combine and a longer leg portion, outlined by the block 211, extending rearwardly from the bottom of the short leg portion. The drive wheels 36 are mounted at the bottom of the short leg portion within the block 210, the threshing cylinder 20 is journaled above the drive wheels, and the engine 40 and the main drive unit are positioned above the threshing cylinder.

The longer leg portion 211 contains the fanning mill and shaker shoe assembly of the separator apparatus 25 and includes the combine steering wheels 37 at its rear end. The L-shaped leg portions 210, 211 thus make up the basic combine chassis, and it will be appreciated that these elements are symmetrically arranged on the combine frame so that the basic chassis is in lateral balance.

To complete the combine structure, a header assembly 15 is mounted on the front of the leg portion 210 and the grain tank and straw walker assemblies are fitted on top of the longer leg portion 211 behind the leg portion 210. It is therefore quite simple to modify the basic combine chassis by mounting on the L-shaped frame structure a header assembly, and straw walker and grain tank assemblies, of any desired capacity or of any particular type to handle specific crops. The design and arrangement of the combine 10 thus facilitates adapting the basic combine chassis for handling crops of any desired nature.

We claim as our invention:

1. A self-propelled combine comprising, in combination, a wheeled frame having thereon units for performing conventional harvesting and treating operations, an operator's platform and source of power disposed on said frame at substantially a common level, said source of power including an enclosure having a filtering air intake, and power transmission means coupling said source of power to said harvesting and treating units.

2. A self-propelled combine comprising, in combination, a wheeled frame having thereon units for performing conventional harvesting and treating operations, an operator's platform and source of power disposed at substantially a comomn level on the top front portion of the frame, said source of power extending generally fore-and-aft relative to the combine and including an enclosure having a filtering air intake, and power transmission means coupling said source of power to said harvesting and treating units.

3. A self-propelled combine comprising, in combination, a wheeled frame having thereon units for performing conventional harvesting and treating operations, an operator's platform and source of power disposed on said frame at substantially a common level, said source of power including an enclosure having a filtering air intake, a grain tank mounted on said frame adjacent to said source of power and defining a part of said enclosure, and power transmission means coupling said source of power to said harvesting and treating units.

4. A self-propelled combine comprising, in combination, a wheeled frame having thereon units for performing conventional harvesting and treating operations, an operator's platform and source of power disposed at substantially a common level on the top front portion of said frame, said source of power extending generally fore-and-aft relative to the combine and including an enclosure having a filtering air intake, said enclosure including a grain tank mounted on said frame rearwardly of said source of power and a wall portion intermediate the operator's platform and the source of power, said wall portion being disposed along a side of the source of power which is opposed to the location of the filtering air intake, and power transmission means coupling said source of power to said harvesting and treating units.

5. A self-propelled combine comprising, in combination, a wheeled frame having thereon units for performing conventional harvesting and treating operations, a source of power extending fore-and-aft along the upper longitudinally extending central portion of said frame, an operator's platform disposed adjacent to one side of the source of power at substantially a common level therewith, said source of power including an enclosure having a filtering air intake disposed adjacent to the other side of said source of power, a grain tank having a pair of side portions mounted on said frame rearwardly of said operator's platform and said filtering air intake respectively and a central portion in communication with said side portions, said central portion being disposed rearwardly of said source of power, and power transmission means coupling said source of power to said harvesting and treating units.

6. A self-propelled combine comprising, in combination, a wheeled frame having thereon units for performing conventional harvesting and treating operations, an operator's platform and source of power disposed in the upper front portion of said frame at substantially a common level, said source of power including an enclosure having a filtering air intake, a grain tank defining a part of said enclosure, said grain tank having a pair of side portions mounted against opposite sides of said frame and a center portion in communication with said side portions, said center portion of said grain tank being disposed rearwardly of said source of power, and power transmission means coupling said source of power to said harvesting and treating units.

7. A self-propelled combine comprising, in combination, a wheeled frame having thereon units for performing conventional harvesting and treating operations, an operator's platform and source of power disposed on said frame at substantially a common level, said source of power including an enclosure having a filtering air intake, a grain tank having a pair of side portions mounted against opposite sides of said frame and a center portion in communication with said side portions, said side portions of the grain tank having extensions defining shielded pockets, and power transmission means extending through said pockets for coupling said source of power to said harvesting and treating units.

8. A self-propelled combine comprising, in combination, a wheeled frame having thereon units, including a separator assembly, for performing conventional harvesting and treating operations, an operator's platform and source of power disposed on said frame at substantially a common level, said source of power including an enclosure having a filtering air intake, said separator assembly being supported on said frame rearwardly of said source of power and including a housing having top and opposite side walls, a grain tank supported on said frame rearwardly of said source of power, said grain tank having a central portion overlying said separator assembly with the top of the respective assembly defining the bottom of the central portion of the grain tank, said grain tank also having opposite side portions disposed adjacent the center portion thereof and extending down along opposite sides of said separator assembly with the side walls of the housing of the separator assembly defining the inner walls of the respective side portions of the grain tank, said side portions of the grain tank having extensions at their forward end, said extensions being spaced from the side walls of said housing to define a pair of shielded pockets extending down along the sides of the frame, and power transmission means extending through said pockets for coupling said source of power to said harvesting and treating units.

9. A self-propelled combine comprising, in combination, a wheeled frame having thereon units, including a theshing cylinder mounted on the front of said frame and a separator assembly supported on said frame rearwardly of said threshing cylinder, for performing conventional harvesting and treating operations, an operator's platform and source of power disposed on said frame at substantially a common level, said source of power including an enclosure having a filtering air intake, said separator assembly having a housing including top and opposite side walls, a grain tank having a center portion overlying said separator assembly with the top of the housing of said separator assembly defining the bottom of said center portion of the grain tank, said grain tank also having opposite side portions disposed adjacent to said center portion in communication therewith and extending down along the opposite sides of said separator assembly with said side walls of the housing of the separator assembly defining the inner walls of the respective side portions of the grain tank, and power transmission means coupling said source of power to said harvesting and treating units.

10. A self-propelled combine comprising, in combination, a wheeled frame having thereon units for performing conventional harvesting and treating operations, said frame having a short upstanding leg portion and a longer leg portion extending rearwardly from the bottom of the short leg portion to define a generally L-shaped structure, ground engaging drive wheels mounted at the bottom of the short leg portion, ground engaging steerable wheels mounted on said longer leg portion, an operator's platform and source of power disposed at substantially a common level on the upper part of said short leg portion, said source of power including an enclosure having a filtering air intake, and power transmission means coupling said source of power to said harvesting and treating units.

11. The self-propelled combine as set forth in claim 10 wherein said units include a threshing cylinder journalled on said frame below said operator's platform and said source of power, a fanning mill and shaker shoe assembly carried by the longer leg portion of said frame, a separator assembly mounted on said longer leg portion of said frame rearwardly of said threshing cylinder, and a grain tank lying over the top and along the sides of said separator assembly.

12. A self-propelled combine comprising, in combination, a wheeled frame having thereon units for performing conventional harvesting and treating operations, an operator's platform and source of power disposed on said frame at substantially a common level, said source of power including an enclosure having a filtering air intake, a grain tank mounted on said frame, said grain tank having a portion disposed along said frame, said portion being substantially longer and deeper than it is wide, a grain elevator extending only to the top of the tank for lifting and depositing grain into the portion of said tank, a leveling auger disposed in the top of the portion of said tank for distributing grain deposited by said grain elevator at a uniform level in the portion of the tank, and power transmission means coupling said source of power to said harvesting and treating units.

13. A self-propelled combine comprising, in combination, a wheeled frame having thereon units for performing conventional harvesting and treating operations, an operator's platform and source of power disposed on said frame at substantially a common level, said source of power including an enclosure having a filtering air intake and an output shaft extending generally fore-and-aft relative to the frame, power transmission means coupling said source of power to said harvesting and treating units, said power transmission means including a main drive mechanism having a housing secured to one end of the source of power, a first shaft journalled in said housing and extending generally transversely relative to the frame, said first shaft being coupled to the output shaft of the source of power, a clutch in said housing arranged to selectively couple the first shaft to a second shaft extending generally transversely relative to the frame, said units being coupled to said second shaft to enable the units to be controlled by said clutch, a pump for developing hydraulic pressure, means directly coupling said pump to said first shaft, a ground wheel drive, a grain unloading auger, and means including individual clutches for selectively coupling said ground wheel drive and said unloading auger to said first shaft to enable the ground wheel drive and the unloading auger to be operated individually of said units.

14. A self-propelled combine comprising, in combination, a wheeled frame having thereon units for performing conventional harvesting and treating operations, an operator's platform and source of power disposed on said frame at substantially a common level, said source of power including an enclosure having a filtering air intake and an output shaft extending generally fore-and-aft relative to the frame, power transmission means coupling said source of power to said harvesting and treating units, said power transmission means including a main drive mechanism having a first shaft extending generally transversely relative to the frame, said first shaft being coupled to the output shaft of said source of power, a clutch for selectively coupling said first shaft to a second shaft extending generally transversely relative to the frame, said units being coupled to said second shaft to enable all of the units to be controlled by said clutch, a ground wheel drive, and means for selectively coupling said ground wheel drive to said first shaft to enable the ground wheel drive to be operated independently of said units.

15. A self-propelled combine comprising, in combination, a wheeled frame having thereon units for performing conventional harvesting and treating operations, an operator's platform and source of power disposed on said frame at substantially a common level, said source of power including an enclosure having a filtering air intake and an output shaft extending generally fore-and-aft relative to said frame, power transmission means coupling said source of power to said harvesting and treating units, said power transmission means including a main drive mechanism coupled to said source of power, said mechanism including oppositely extending drive shafts arranged transversely of said frame and disposed at one end of the source of power to define therewith a T-shaped structure, said drive mechanism further including a first clutch for selectively coupling said units to said one shaft, a second clutch disposed adjacent the other one of said shafts for selectively coupling an unloading auger to said other shaft, and means for coupling the other shaft to a ground wheel drive.

16. A self-propelled combine comprising, in combination, a wheeled frame having thereon units for performing conventional harvesting and treating operations, an operator's platform and source of power disposed on said frame at substantially a common level, said source of power including an enclosure having a filtering air intake and an output shaft extending generally fore-and-aft relative to the frame, and power transmission means coupling said source of power to said harvesting and treating units, said power transmission means including a main drive mechanism coupled to said source of power, said main drive mechanism having oppositely extending drive shafts arranged transversely of said frame and defining with said output shaft a T-shaped structure, a clutch for selectively coupling one of said drive shafts to said output shaft, means for coupling said units to said one shaft, and means for coupling the other one of said drive shafts to a ground wheel drive disposed adjacent to said operator's platform.

17. A self-propelled combine comprising, in combination, a wheeled frame having thereon units for performing conventional harvesting and treating operations, an operator's platform and source of power disposed on said frame at substantially a common level, said source of power including an enclosure having a filtering air intake and an output shaft, and power transmission means coupling said source of power to said harvesting and treating units, said power transmission means having oppositely extending drive shafts arranged transversely of said output shaft and defining therewith a T-shaped structure.

References Cited in the file of this patent

UNITED STATES PATENTS

| | | |
|---|---|---|
| 2,292,958 | Millard et al. | Aug. 11, 1942 |
| 2,373,356 | Thoms et al. | Apr. 10, 1945 |
| 2,510,325 | Anderson | June 6, 1950 |
| 2,528,275 | Heth | Oct. 31, 1950 |
| 2,625,001 | Heun | Jan. 13, 1953 |
| 2,633,255 | Hoffstetter | Mar. 31, 1953 |
| 2,644,284 | Oberholtz | July 7, 1953 |
| 2,695,485 | Krause et al. | Nov. 30, 1954 |
| 2,743,571 | Turnbull | May 1, 1956 |
| 2,814,351 | Richey et al. | Nov. 26, 1957 |
| 2,851,119 | Thompson et al. | Sept. 9, 1958 |